US008601509B2

(12) United States Patent  (10) Patent No.: US 8,601,509 B2
Mitchals et al.  (45) Date of Patent: Dec. 3, 2013

(54) SYSTEM AND METHOD FOR DETECTING CLOSED CAPTIONING AND CREATING A CLOSED CAPTIONING ELECTRONIC PROGRAMMING GUIDE

(75) Inventors: Frank Mitchals, Willard, MO (US); Douglas Medina, Grain Valley, MO (US); Todd W. Jones, Kansas City, MO (US)

(73) Assignee: AT&T Intellectual Property II, LP, Atlanta, GA (US)

( * ) Notice: Subject to any disclaimer, the term of this patent is extended or adjusted under 35 U.S.C. 154(b) by 737 days.

(21) Appl. No.: 12/199,201

(22) Filed: Aug. 27, 2008

(65) Prior Publication Data

US 2010/0058385 A1  Mar. 4, 2010

(51) Int. Cl.
 *G06F 3/00* (2006.01)
(52) U.S. Cl.
 USPC .......... 725/39; 725/42; 725/51; 725/58; 725/109; 725/112; 725/131; 725/136
(58) Field of Classification Search
 USPC .......... 725/39, 51, 109, 112, 131, 136, 42, 58
 See application file for complete search history.

(56) References Cited

U.S. PATENT DOCUMENTS

| 6,421,067 | B1 | 7/2002 | Kamen et al. |
| 6,564,383 | B1 * | 5/2003 | Combs et al. ................. 725/136 |
| 6,631,523 | B1 | 10/2003 | Matthews, III et al. |
| 6,901,207 | B1 | 5/2005 | Watkins |
| 6,931,657 | B1 | 8/2005 | Marsh |
| 7,712,117 | B1 * | 5/2010 | Mohr ............................... 725/41 |
| 2002/0019981 | A1 | 2/2002 | Schein et al. |
| 2004/0060062 | A1 | 3/2004 | Shioya |
| 2004/0139465 | A1 * | 7/2004 | Matthews et al. ............... 725/51 |
| 2004/0154039 | A1 | 8/2004 | Simms et al. |
| 2005/0028206 | A1 | 2/2005 | Cameron et al. |
| 2005/0240964 | A1 | 10/2005 | Barrett |
| 2005/0262539 | A1 * | 11/2005 | Barton et al. .................... 725/90 |
| 2005/0278747 | A1 | 12/2005 | Barton et al. |
| 2006/0037046 | A1 | 2/2006 | Simms et al. |
| 2006/0037060 | A1 | 2/2006 | Simms et al. |
| 2007/0022435 | A1 | 1/2007 | Kwon |
| 2007/0136777 | A1 | 6/2007 | Hasek et al. |
| 2007/0156589 | A1 | 7/2007 | Zimler et al. |
| 2010/0045866 | A1 * | 2/2010 | Angiolillo ..................... 348/554 |

* cited by examiner

*Primary Examiner* — Jivka Rabovianski
(74) *Attorney, Agent, or Firm* — Guntin & Gust, PLC; Jay H. Anderson

(57) ABSTRACT

A set-top box device includes a detector module and an electronic programming guide module. The detector module is configured to detect a closed captioning flag in a video stream, and to cache electronic programming guide information for the video stream if the video stream includes the closed captioning flag. The detector module is further configured to create a closed captioning electronic programming guide including the electronic programming guide information. The electronic programming guide module is in communication with the detector module, and is configured to output the closed captioning electronic programming guide.

20 Claims, 7 Drawing Sheets

SYSTEM AND METHOD FOR DETECTING CLOSED CAPTIONING AND CREATING A CLOSED CAPTIONING ELECTRONIC PROGRAMMING GUIDE

FIELD OF THE DISCLOSURE

The present disclosure generally relates to communications networks, and more particularly relates to a system and method for creating a closed captioning electronic programming guide for television programs containing closed captioning.

BACKGROUND

Many television service providers offer an electronic programming guide to their customers, so that the customers can view program information for television programs that are currently being provided and for television programs that will be provided at future times. Additionally, as users browse through the television programs displayed on a television, the program information for the television program can be presented to the user. Another feature offered by a television service provider is closed captioning for select television programs. The user can turn on a closed captioning feature of a set-top box device and/or the television, so that as the user browses through the television programs the user can see if closed captioning is provided for the television program.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
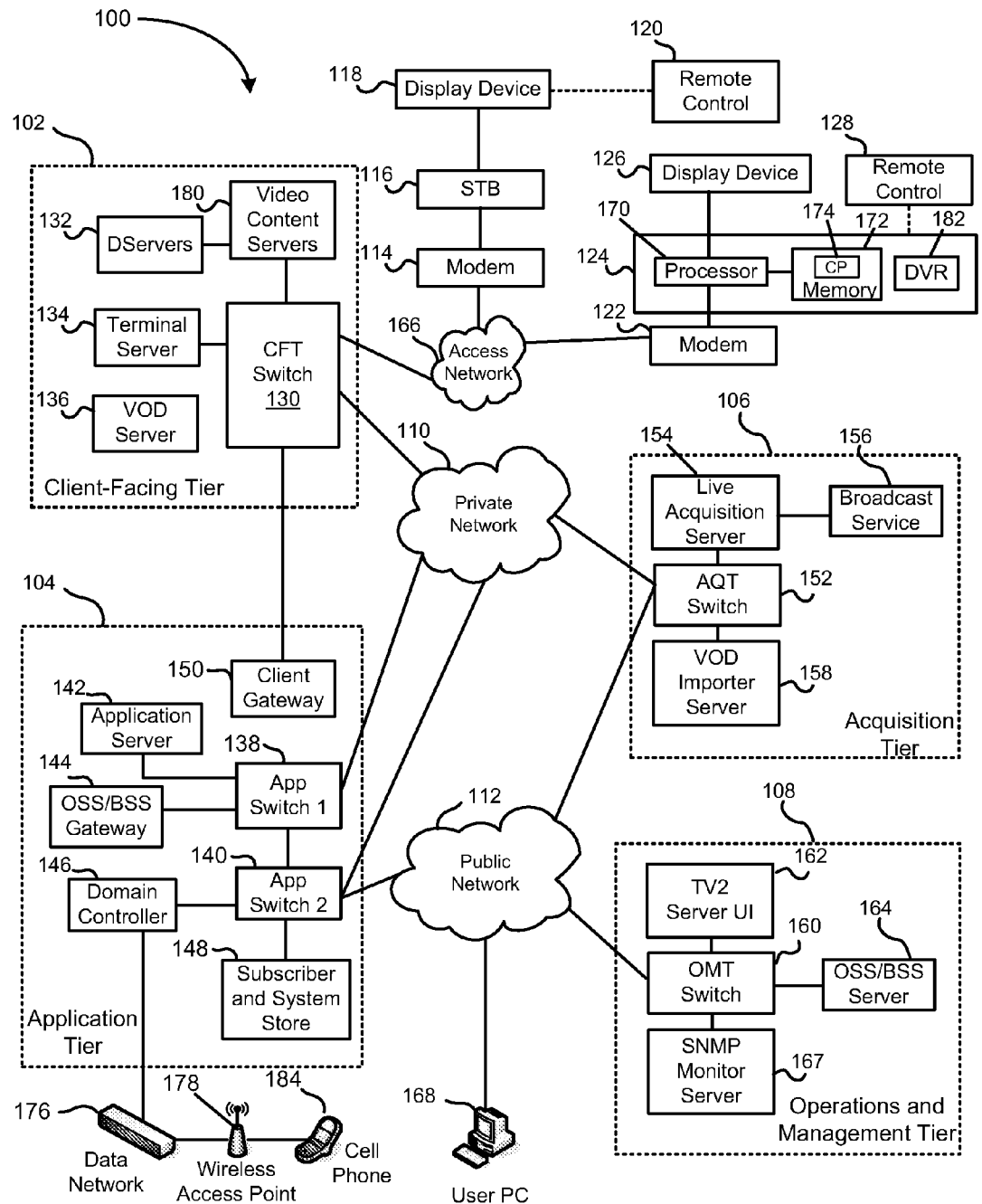
FIG. 1 is a block diagram illustrating an Internet Protocol Television (IPTV) system.

FIG. 1 shows an IPTV system 100 including a client facing tier 102, an application tier 104, an acquisition tier 106, and an operations and management tier 108. Each tier 102, 104, 106, and 108 is coupled to one or both of a private network 110 and a public network 112. For example, the client-facing tier 102 can be coupled to the private network 110, while the application tier 104 can be coupled to the private network 110 and to the public network 112 such as the Internet. The acquisition tier 106 can also be coupled to the private network 110 and to the public network 112. Moreover, the operations and management tier 108 can be coupled to the public network 112.

The various tiers 102, 104, 106 and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an Internet Protocol Television (IPTV) network. In an illustrative embodiment, modems such as a first modem 114 and a second modem 122 can be coupled to the private access network 166. The client-facing tier 102 can communicate with a first representative set-top box device 116 via the first modem 114 and with a second representative set-top box device 124 via the second modem 122. The client-facing tier 102 can communicate with a large number of set-top boxes over a wide geographic area, such as a regional area, a metropolitan area, a viewing area, or any other suitable geographic area that can be supported by networking the client-facing tier 102 to numerous set-top box devices. In one embodiment, the client-facing tier 102 can be coupled to the modems 114 and 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Each set-top box device 116 and 124 can process data received from the private access network 166 via an IPTV software platform such as Microsoft®) TV IPTV Edition.

The first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device can communicate with a second remote control 128. In an exemplary, non-limiting embodiment, each set-top box device 116 and 124 can receive data or video from the client-facing tier 102 via the private access network 166 and render or display the data or video at the display device 118 or 126 to which it is coupled. The set-top box devices 116 and 124 thus may include tuners that receive and decode television programming information for transmission to the display devices 118 and 126. Further, the set-top box devices 116 and 124 can include a set-top box processor 170 and a set-top box memory device 172 that is accessible to the set-top box processor. In a particular embodiment, the set-top box devices 116 and 124 can also communicate commands received from the remote controls 120 and 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material. The CFT switch 130 can also be coupled to a terminal server 134 that provides terminal devices, such as a game application server and other devices with a common connection point to the private network 110. In a particular embodiment, the CFT switch 130 can also be coupled to a video-on-demand (VOD) server 136.

The application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. The application server 142 provides applications to the set-top box devices 116 and 124 via the private access network 166, so the set-top box devices 116 and 124 can provide functions such as display, messaging, processing of IPTV data and VOD material. In a particular embodiment, the OSS/BSS gateway 144 includes operation systems and support (OSS) data, as well as billing systems and support (BSS) data.

The second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices, from accessing the private network 110 by denying access to these devices beyond the private access network 166.

For example, when the set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the set-top box device 116 access to IPTV content and VOD content. If the client gateway 150 cannot verify subscriber information for the set-top box device 116, such as because it is connected to a different twisted pair, the client gateway 150 can deny transmissions to and from the set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a video-on-demand importer server 158 that stores television content received at the acquisition tier 106 and communicate the stored content to the client-facing tier 102 via the private network 110.

The operations and management tier 108 can include an operations and management tier (OMT) switch 160 that conducts communication between the operations and management tier 108 and the public network 112. In the illustrated embodiment, the OMT switch 160 is coupled to a TV2 server 162. Additionally, the OMT switch 160 can be coupled to an OSS/BSS server 164 and to a simple network management protocol (SNMP) monitor 167 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 in turn can transmit the television content to the AQT switch 152 and the AQT switch can transmit the television content to the CFT switch 130 via the private network 110. Further, the television content can be encoded at the D-servers 132, and the CFT switch 130 can communicate the television content to the modems 114 and 122 via the private access network 166. The set-top box devices 116 and 124 can receive the television content from the modems 114 and 122, decode the television content, and transmit the content to the display devices 118 and 126 according to commands from the remote control devices 120 and 128.

Additionally, at the acquisition tier 106, the VOD importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136.

When a user issues a request for VOD content to the set-top box device 116 or 124, the request can be transmitted over the private access network 166 to the VOD server 136 via the CFT switch 130. Upon receiving such a request, the VOD server 136 can retrieve requested VOD content and transmit the content to the set-top box device 116 or 124 across the private access network 166 via the CFT switch 130. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer (PC) 168 coupled to the public network 112.

The domain controller 146 communicates with the public network 112 via the second APP switch 140. Additionally, the domain controller 146 can communicate via the public network 112 with the PC 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access device 178 can communicate with user wireless devices such as a cellular telephone 184.

In a particular embodiment, the set-top box devices can include a set-top box computer program 174 that is embedded within the set-top box memory device 172. The set-top box computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124 by associating the user account with an IP address of the second set-top box device, with data relating to one or more twisted pairs connected with the second set-top box device, with data related to one or more fiber optic cables connected with the second set-top box device, with an alphanumeric identifier of the second set-top box device, with any other data that is suitable for associating the second set-top box device with a user account, or with any combination of these.

The set-top box computer program 174 can contain instructions to receive many types of user preferences from the domain controller 146 via the access network 166. For example, the set-top box computer program 174 can include instructions to receive a request to record at least one television program at a video content storage module such as a digital video recorder (DVR) 182 within the second set-top box device 124. In this example embodiment, the set-top box computer program 174 can include instructions to transmit the request to the DVR 182, where the television program(s) are recorded. In an illustrative embodiment, the set-top box computer program 174 can include instructions to receive from the DVR 182 a recording status with respect to one or more of the television programs and to transmit at least one message regarding the status to a wireless device, such as the cellular telephone 184. The message can be received at the CFT switch 130, for instance, and communicated to the domain controller 146 across the private network 110 via the second APP switch 140. Further, the domain controller 146 can transmit the message to the wireless data network 176, directly or via the public network 112, and on to the wireless network access point 178. The message can then be transmitted to the cellular telephone 184. In an illustrative embodiment, the status can be sent via a wireless access protocol (WAP).

Figure 2:
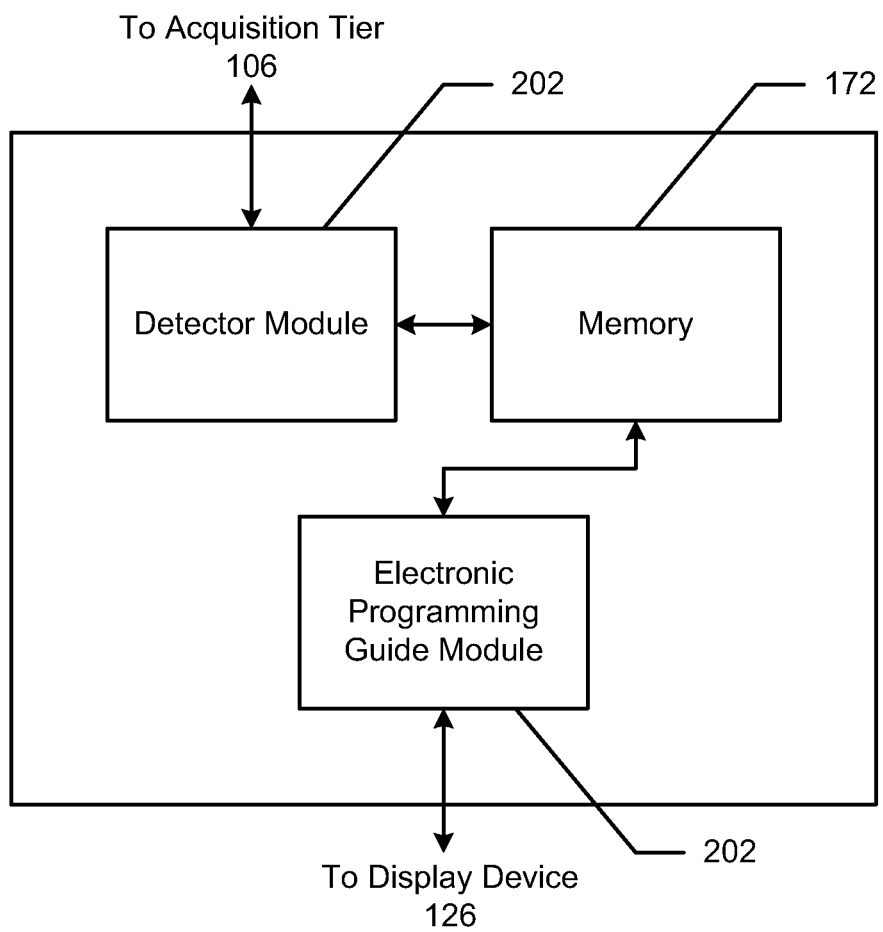
FIG. 2 is a block diagram of a set-top box device.

FIG. 2 shows a block diagram of a portion of the set-top box device 124 including a detector module 202, an electronic programming guide (EPG) module 204, and the memory 172. The detector module 202 is in communication with the EPG module 204 and with the memory 172. The detector module 202 is also in communication with the acquisition tier 106 through the access network 166 and the private network 110 via the modem 122 as shown in FIG. 1. The EPG module 204 is in communication with the memory 172 and with the display device 126. In various embodiments, the detector module 202 and the EPG module 204 can be implemented in hardware, in software, and/or in any combination of hardware and software.

In an embodiment, the set-top box device 124 can receive a video stream that is associated with television content from the live acquisition server 154, and the detector module 202 can determine whether a closed captioning flag is located in the header of the video stream. If there is a closed captioning flag set for the video stream, program information corresponding to the television content can be cached in the memory 172. The program information can include a channel number, a program description, a program time, and the like. The detector module 202 can scan the header of each video stream associated with a television program from the live acquisition server 154, and can compile a list of television programs containing closed captioning in the memory 172.

Figure 3:
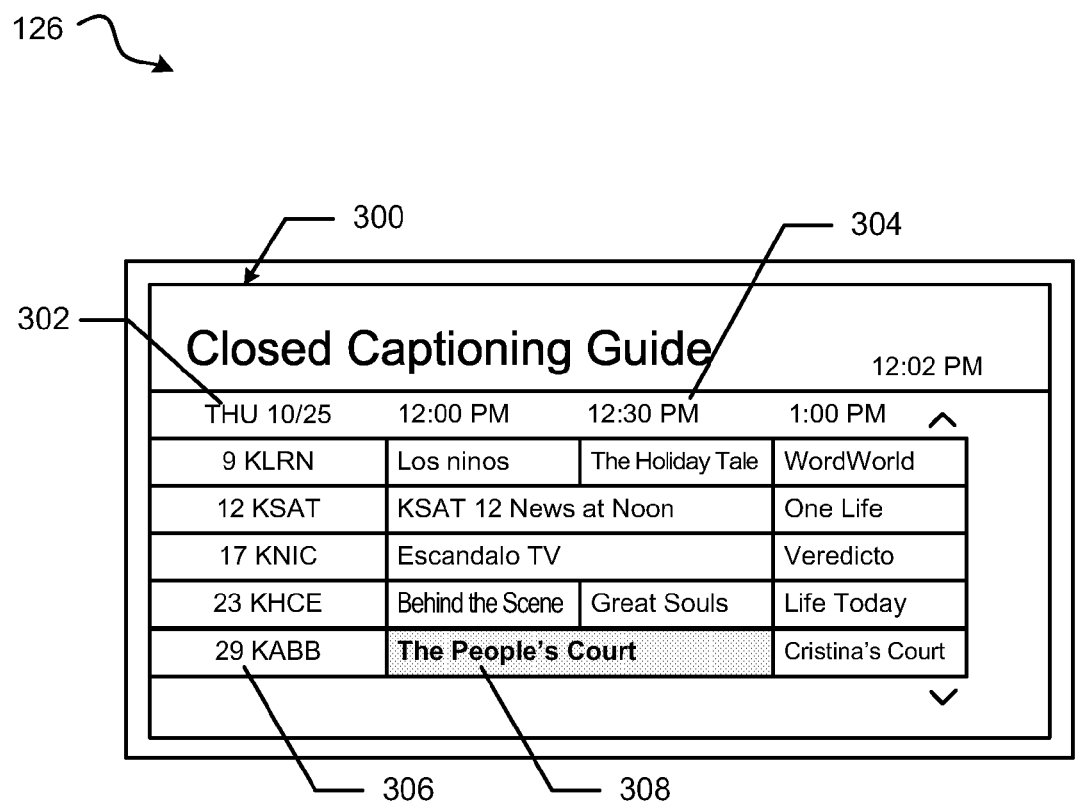
FIG. 3 is an exemplary schematic illustration of a closed captioning electronic programming guide.

The user can send a request for a closed captioning EPG to the set-top box device. Upon the EPG module 204 receiving the request, the EPG module can retrieve the closed captioning list stored in the memory 172 and can output a closed captioning EPG 300 to the display device 126 as shown in FIG. 3. The closed captioning EPG 300 includes a date display 302, a viewing time display 304, a channel display 306, and a program title display 308. The date display 302 can indicate a date that the television programs listed in the closed captioning EPG 300 can be provided by the IPTV system 100 to the set-top box device 124. The viewing time display 304 can indicate the time that the television programs listed can be viewed by the user. The channel display 306 can indicate the channel that provides the television program. The program title display 308 can indicate the name of the television program.

Figure 4:
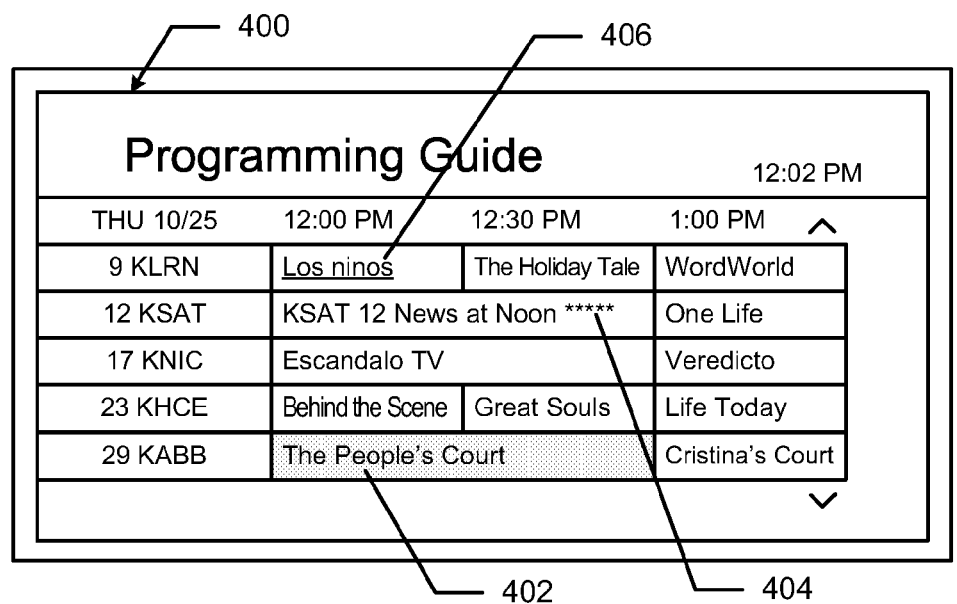
FIG. 4 is an exemplary schematic illustration of an alternative electronic programming guide.

All of the television programs listed in the closed captioning EPG 300 are available with closed captioning. The user can scroll through the closed captioning EPG 300 and select a specific program title, such as the program title display 308. Therefore, the user does not have to view each television program individually on the display device 126 to determine whether closed captioning is provided. In an alternative embodiment, an EPG 400 can list all of the television programs provided by the IPTV system 100 as shown in FIG. 4. The television programs containing closed captioning, however, can be identified by a highlighted program title 402, by a starred program title 404, by an underlined program title 406, and the like. Thus, the user can identify which television programs have closed captioning but can also view the programs that do not have closed captioning.

In another embodiment, the detector module 202 can receive electronic programming information for all of the television programs offered by the IPTV system 100. The detector module 202 can use the electronic programming information to determine whether a television program is provided with closed captioning, and store the corresponding electronic programming information in the memory 172. Upon the user requesting the closed captioning EPG 300, the EPG module 204 can retrieve the electronic programming information from the memory 172 and can output the closed captioning EPG to the display device 126. Thus, the detector module 202 can detect whether a television program contains closed captioning from either the video stream or the electronic programming information associated with the television program.

The closed captioning detection was described in relation to the set-top box device 124, however it should be understood that the closed captioning detection could be performed at any device or server in the IPTV system 100, such as the live acquisition server 154. Additionally, the closed captioning detection could also be performed at a device or server (not shown) between the broadcast service 156 and the live acquisition server 154.

Figure 5:
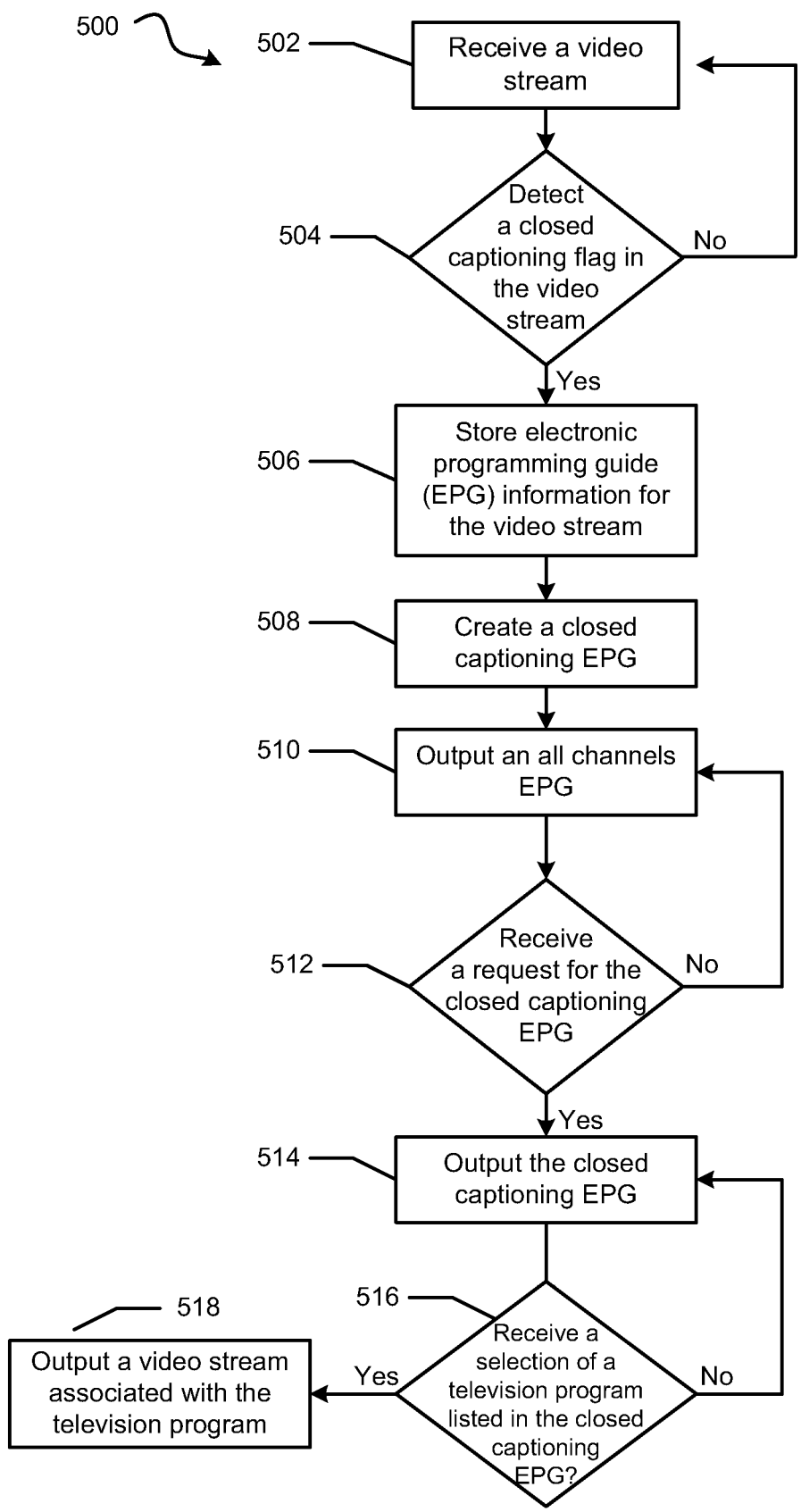
FIG. 5 is a flow diagram of a method for creating the closed captioning electronic programming guide.

The set-top box device 124 and/or a back end server of the IPTV system 100 can detect whether a television program has closed captioning, and can create a closed captioning EPG based on the television programs containing closed captioning. FIG. 5 shows a flow diagram of a method 500 for creating a closed captioning electronic programming guide. At block 502, a video stream is received. The video stream can be received at a set-top box device and/or a network server. A determination is made whether a closed captioning flag is detected in the video stream at block 504. If the closed captioning flag is not detected, the flow diagram continues at stated above at block 502. If the closed captioning flag is detected, EPG information for the video stream is stored at block 506. At block 508, a closed captioning EPG including the EPG information is created. At block 510, an all channels EPG is output. A determination is made whether a request for the closed captioning EPG is received at block 512.

If the request for the closed captioning EPG is not received, the flow diagram continues as stated above at block 510. At block 514, if the request for the closed captioning EPG is received, the closed captioning EPG is output. At block 516, a determination is made whether a selection of a television program listed in the closed captioning EPG is received. If the selection is not received, the flow diagram continues as stated above at block 514. At block 518, if the selection is received, a video stream associated with the selection of the television program is output.

Figure 6:
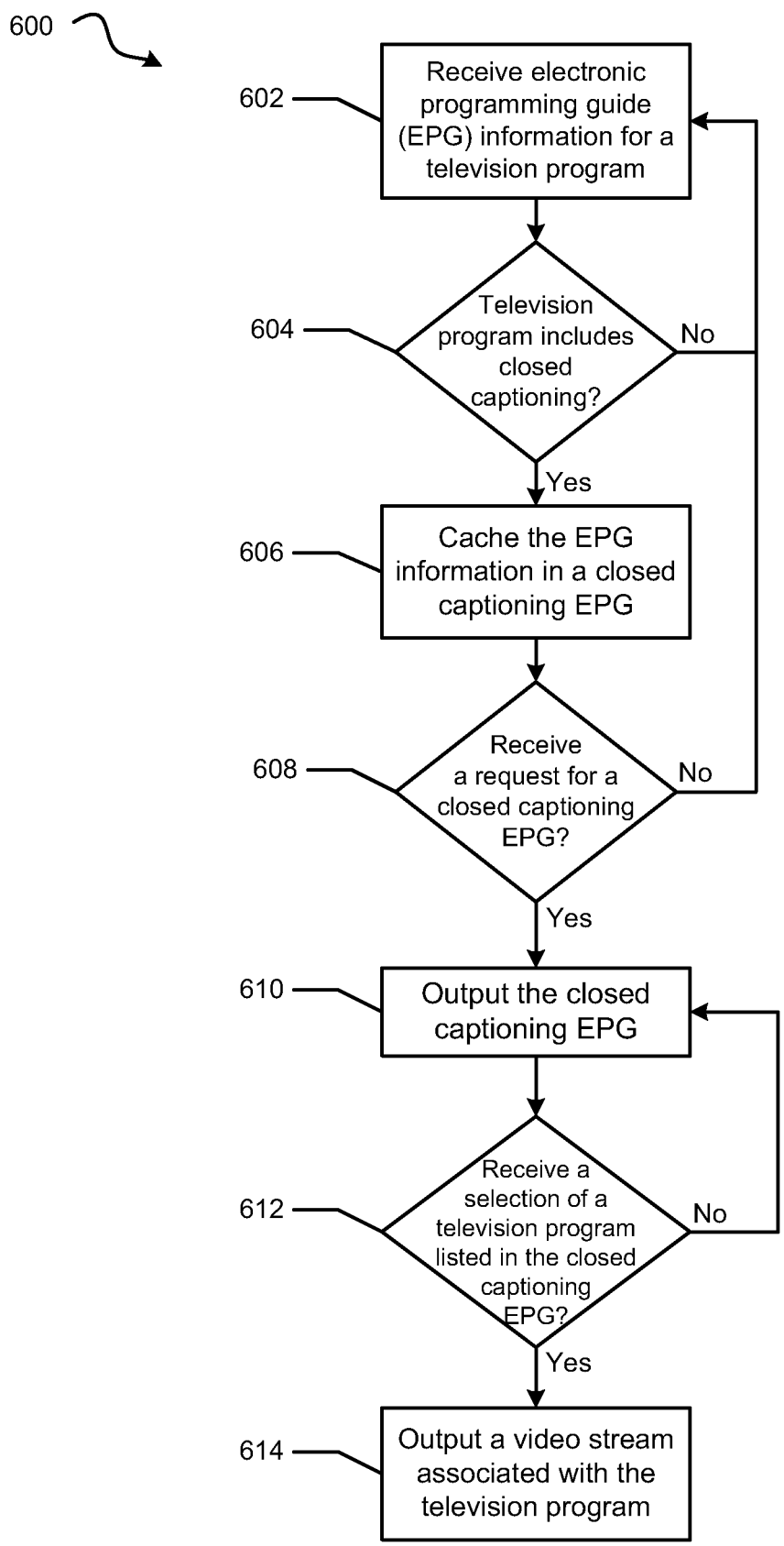
FIG. 6 is a flow diagram of an alternative method for creating the closed captioning electronic programming guide.

FIG. 6 shows a flow diagram of an alternative method 600 for creating a closed captioning electronic programming guide. At block 602, EPG information for a television program is received. A determination is made whether the television program includes closed captioning at block 604. The EPG information is used to determine if the television program includes closed captioning. If the television program does not include closed captioning, the flow diagram continues as stated above at block 602. At block 606, if the television program does include closed captioning, the EPG information is cached in a closed captioning EPG. A determination is made whether a request for a closed captioning EPG is received at block 608.

If the request for the closed captioning EPG is not received, the flow diagram continues as stated above at block 602. At block 610, if the request for the closed captioning EPG is received, the closed captioning EPG is output. At block 612, a determination is made whether a selection of a television program listed in the closed captioning EPG is received. If the selection is not received, the flow diagram continues as stated above at block 610. At block 614, if the selection is received, a video stream associated with the selection of the television program is output.

Figure 7:
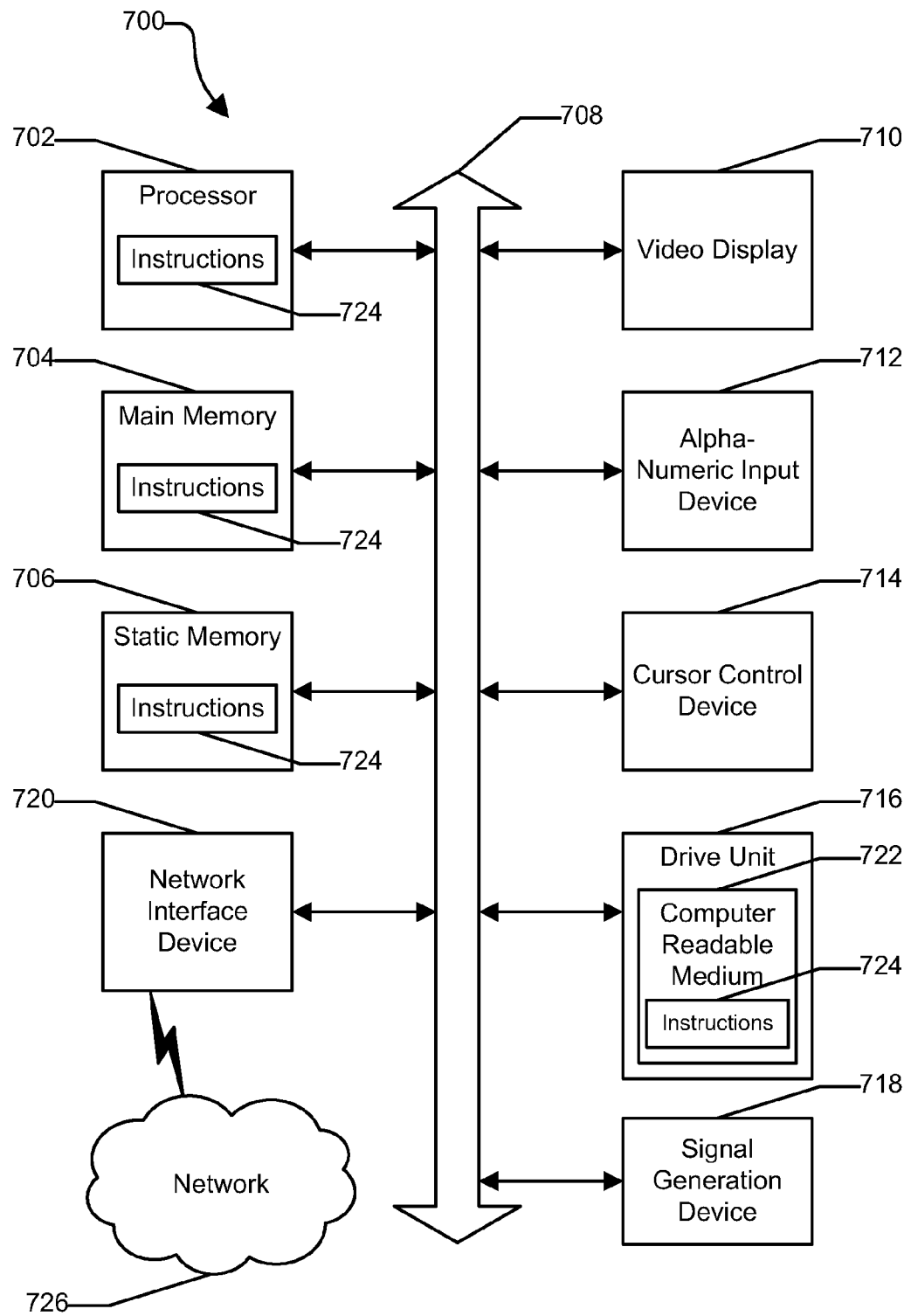
FIG. 7 is a block diagram of a general computer system.

FIG. 7 shows an illustrative embodiment of a general computer system 700 in accordance with at least one embodiment of the present disclosure. The computer system 700 can include a set of instructions that can be executed to cause the computer system to perform any one or more of the methods or computer based functions disclosed herein. The computer system 700 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

The computer system 700 may include a processor 702, e.g., a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media. The network interface device 720 can provide connectivity to a network 726, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the Figures are to be regarded as illustrative rather than restrictive.

The Abstract of the Disclosure is provided to comply with 37C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method comprising:

monitoring, by a processor, a video stream to identify a closed captioning flag, wherein the video stream comprises a header portion and the monitoring is performed only on the header portion;

responsive to the monitoring, detecting, by the processor, the closed captioning flag in the header portion of the video stream, wherein the closed captioning flag indicates that a television program in the video stream contains closed captioning information;

compiling, by the processor, a list of television programs containing closed captioning information by storing information about each television program in response to detecting the closed captioning flag in the header portion of the video stream;

creating a closed captioning electronic programming guide according to the compiled list of television programs containing closed captioning information, wherein the closed captioning electronic programming guide includes only television programs with closed captioning information;

storing the closed captioning electronic programming guide in a memory; and outputting the closed captioning electronic programming guide responsive to receiving a first user input requesting the closed captioning electronic programming guide.

2. The method of claim 1, comprising:

presenting another electronic programming guide that includes the television program containing the closed captioning information and another television program that does not contain any closed captioning information; and outputting a portion of the closed captioning information associated with a program responsive to receiving a second user input requesting the portion of the closed captioning information, wherein the second user input is received in response to a selection made from the other electronic programming guide, wherein the processor is a component of a set-top box device, and wherein the set-top box device performs the creating, storing and outputting of the closed captioning electronic programming guide.

3. The method of claim 1 further comprising:

receiving a selection of a television program listed in the closed captioning electronic programming guide; and outputting a digital stream associated with the television program in response to the selection of the television program.

4. The method of claim 1 wherein the closed captioning electronic programming guide comprises a channel number, a program description, a program time, or a combination thereof.

5. The method of claim 1 further comprising:
receiving a request for the closed captioning electronic programming guide prior to outputting the closed captioning electronic programming guide.

6. A method comprising:
monitoring, by a system including a processor, a video stream for a closed captioning flag, wherein the video stream comprises a header portion and the monitoring is performed only on the header portion;
based on the monitoring, detecting, by the system, in the video stream a plurality of television programs including closed captioning information;
based on the detecting, storing, by the system, the closed captioning information in a memory;
creating a closed captioning electronic programming guide including only the plurality of television programs including the closed captioning information;
storing the closed captioning electronic programming guide in the memory; and
retrieving the closed captioning electronic programming guide from the memory and presenting the closed captioning electronic programming guide responsive to receiving user input requesting the closed captioning electronic programming guide.

7. The method of claim 6, wherein the system comprises a set-top box device.

8. The method of claim 6, wherein the closed captioning information comprises a channel number, a program title, or a program time.

9. The method of claim 6 wherein the closed captioning electronic programming guide comprises a channel number, a program description, a program time, or a combination thereof.

10. The method of claim 6 further comprising:
receiving a selection of a television program listed in the closed captioning electronic programming guide; and
outputting a digital stream associated with the television program in response to the selection of the television program.

11. A set-top box device comprising:
a memory storing computer instructions;
a detector circuit coupled with the memory, wherein the detector circuit, responsive to executing the computer instructions, performs operations comprising:
analyzing a video stream to identify a closed captioning flag, wherein the video stream comprises a header portion and the analyzing is performed only on the header portion;
detecting the closed captioning flag in the header of the video stream based on the analyzing;
storing in the memory descriptive information about a media program in the video stream responsive to the detecting, the media program comprising closed captioning information;
creating a closed captioning electronic programming guide for presenting the descriptive information about the media program comprising closed captioning information, wherein the closed captioning electronic programming guide excludes media programs not including closed captioning information; and
storing the closed captioning electronic programming guide; and an electronic programming guide circuit coupled with the memory and the detector circuit, wherein the electronic programming guide circuit, responsive to executing the computer instructions, performs operations comprising:
retrieving the closed captioning electronic programming guide and outputting the closed captioning electronic programming guide responsive to receiving user input requesting the closed captioning electronic programming guide.

12. The set-top box device of claim 11, wherein the closed captioning information comprises a channel number, a program title, or a program time.

13. The set-top box device of claim 11 wherein the closed captioning electronic programming guide information comprises a channel number, a program description, a program time, or a combination thereof.

14. The set-top box device of claim 11 wherein the electronic programming guide circuit responsive to executing the computer instructions, performs operations comprising:
receiving a selection of a television program listed in the closed captioning electronic programming guide; and
presenting a digital stream associated with the television program in response to the selection of the television program.

15. A non-transitory computer readable storage medium comprising computer instructions which, responsive to being executed by a processor, cause the processor to perform operations comprising:
receiving a television program from a source device over a network;
determining that the television program includes closed captioning information based on an analysis of a video stream providing the television program to identify a closed captioning flag in the video stream, wherein the video stream comprises a header portion and the analysis is performed only on the header portion;
storing descriptive information about the television program in a closed captioning electronic programming guide, wherein the closed captioning electronic programming guide excludes television programs not including closed captioning information;
storing the closed captioning electronic programming guide in a memory; and
retrieving the closed captioning electronic programming guide from the memory and outputting the closed captioning electronic programming guide, responsive to receiving user input requesting the closed captioning electronic programming guide.

16. The non-transitory computer readable storage medium of claim 15, wherein the closed captioning information comprises a channel number, a program title, or a program time.

17. The non-transitory computer readable storage medium of claim 15, wherein the processor is a component of a set-top box device, and wherein the set-top box device performs the analysis of the header of the video stream.

18. The non-transitory computer readable storage medium of claim 15 wherein the closed, captioning electronic programming guide information comprises a channel number, a program description, a program time, or a combination thereof.

19. The non-transitory computer readable storage medium of claim 15 wherein the operations further comprise:
receiving a selection of a television program listed in the closed captioning electronic programming guide; and
outputting; a digital stream associated with the television program in response to the selection of the television program.

20. The non-transitory computer readable storage medium of claim 17, wherein the network is an internet television protocol network.

\* \* \* \* \*